United States Patent [19]
Borges et al.

[11] Patent Number: 5,878,592
[45] Date of Patent: Mar. 9, 1999

[54] EVAPORATOR HOUSING

[75] Inventors: Bruno R. Borges, La Haye; Joaquim Ferreira, Freneuse; Didier F. Genois, Rouen, all of France

[73] Assignee: Carrier Corporation, Syracuse, N.Y.

[21] Appl. No.: 81,903

[22] Filed: May 20, 1998

[51] Int. Cl.[6] ........................................... F25D 3/06
[52] U.S. Cl. ................ 62/285; 62/239; 62/414; 62/244; 62/298; 98/10
[58] Field of Search .................. 62/298, 272, 279, 62/285

*Primary Examiner*—Henry Bennett

[57] ABSTRACT

An evaporator for a transport refrigeration system configured to be mounted in a conditioned space and having a downwardly facing intake and an air discharge end adapted to discharge conditioned air horizontally. The evaporator includes a structural frame for mounting the unit. The structural frame includes first and second lateral supports extending on opposite sides of the evaporator and at least one horizontal transverse member interconnecting the lateral supports. The evaporator fan is structurally supported by the transverse member at a location in fluid flow communication with the air intake. The evaporator coil extends between the lateral supports intermediate the air discharge end and the location of the evaporator fan. The lateral supports serve as tube sheets of the heat exchanger. An outer cover for the evaporator includes a bottom portion configured to underlie all portions of the heat exchange coil and refrigeration circuit and includes an opening in fluid flow communication with the evaporator fan. The bottom portion further includes a front edge, which defines the lower portion of the air discharge opening and a rear edge which cooperates with a wall of the conditioned space to partially define the back of the evaporator. A pair of side covers are configured to be installed on right and left sides of the evaporator to enclose portions of the refrigeration circuit that extend outwardly from the lateral supports. The configuration of the bottom portion of the cover allows it to collect and dispose of all condensate from the coil and components of the refrigeration circuit.

7 Claims, 9 Drawing Sheets

EVAPORATOR HOUSING

TECHNICAL FIELD

The invention relates in general to refrigeration systems and, more specifically, to transport refrigeration systems suitable for controlling the temperature of a conditioned space of a vehicle such as straight trucks and delivery vans, even more specifically, it relates to the evaporator unit mounted within a conditioned space of such vehicle.

BACKGROUND ART

Transport refrigeration systems for straight trucks and vans commonly utilize separate condenser and evaporator sections or units, with the condenser unit being mounted on the nose or front wall of a straight truck or on a roof of a van, and with an evaporator unit being mounted in a conditioned space of the associated vehicle. Evaporator units for such air conditioning systems have typically been ceiling mounted sheet metal boxes which house the evaporator coil, fan and other associated components.

Such sheet metal boxes typically occupy a large volume of valuable cargo space within the conditioned space of the vehicle. Further, when it is desired to make adjustments to certain components of the refrigeration system, it is necessary to shut down the system in order to safely open the sheet metal box to gain access to components such as the compressor pressure regulating valve ("CPR") and/or the thermostatic expansion valve ("TXV") of the system. In some situations, evaporators are partially disassembled while in operation thereby exposing technicians to dangerous conditions including contact with the evaporator fan. Other drawbacks of prior art systems include their inability to collect condensation from the evaporator coil and thus prevent it from falling on goods stored within the conditioned space. Other problems associated with water collection include the projection of condensate from the evaporator into the conditioned space as a result of the high rate of air flow within the evaporator and across the evaporator coil.

SUMMARY OF THE INVENTION

An evaporator for a transport refrigeration system configured to be mounted in a conditioned space and having a downwardly facing intake and an air discharge end adapted to discharge conditioned air horizontally. The evaporator includes a structural frame for mounting the unit. The structural frame includes first and second lateral supports extending on opposite sides of the evaporator and at least one horizontal transverse member interconnecting the lateral supports. The evaporator fan is structurally supported by the transverse member at a location in fluid flow communication with the air intake. The evaporator coil extends between the lateral supports intermediate the air discharge end and the location of the evaporator fan. The lateral supports serve as tube sheets of the heat exchanger. An outer cover for the evaporator includes a bottom portion configured to underlie all portions of the heat exchange coil and refrigeration circuit and includes an opening in fluid flow communication with the evaporator fan. The bottom portion further includes a front edge, which defines the lower portion of the air discharge opening and a rear edge which cooperates with a wall of the conditioned space to partially define the back of the evaporator. A pair of side covers are configured to be installed on right and left sides of the evaporator to enclose portions of the refrigeration circuit that extend outwardly from the lateral supports. The configuration of the bottom portion of the cover allows it to collect and dispose of all condensate from the coil and components of the refrigeration circuit.

BRIEF DESCRIPTION OF THE DRAWINGS

The invention may be better understood and its objects and advantages will become apparent to those skilled in the art by reference to the accompanying drawings, in which.

DESCRIPTION OF THE PREFERRED EMBODIMENT

Figure 1:
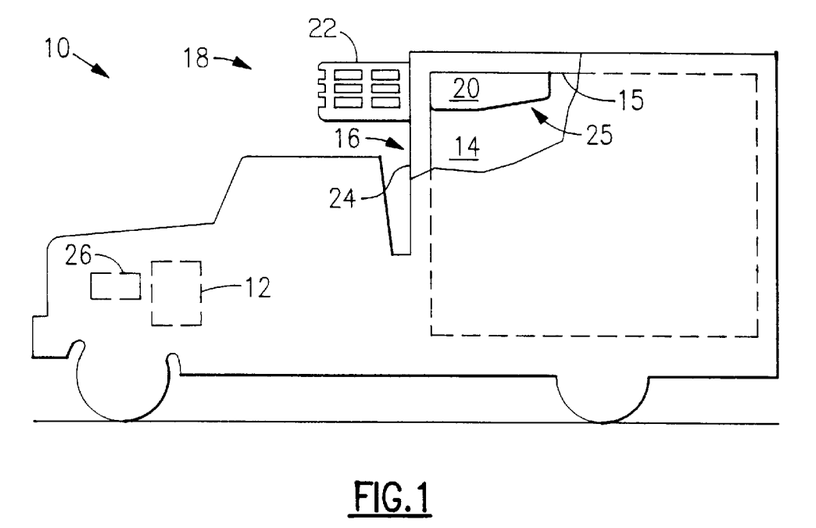
FIG. 1 is an elevational view of a straight truck illustrating a refrigeration system having an evaporator unit, which includes a housing according to the present invention mounted within the conditioned space of the vehicle.

Referring now to the drawings, and to FIG. 1 in particular, there is shown an elevational view of a straight truck 10 having an engine 12 and a conditioned cargo space 14, which is defined by a plurality of insulated wall members, including a forward wall 16 and an upper wall 15. The conditioned cargo space 14 is temperature controlled by way of a transport refrigeration system 18. The transport refrigeration system 18 includes an evaporator unit 20 located in the conditioned cargo space 14 and mounted to the interior of the upper wall 15 and the forward wall 16. A condenser unit 22 is mounted on the vertical front outside surface 24 of wall 16. The system also includes a refrigerant compressor 26 driven by the truck engine 12. As will be seen, the evaporator unit 20 is provided with a three piece outer cover 25 according to the present invention.

Figure 5:
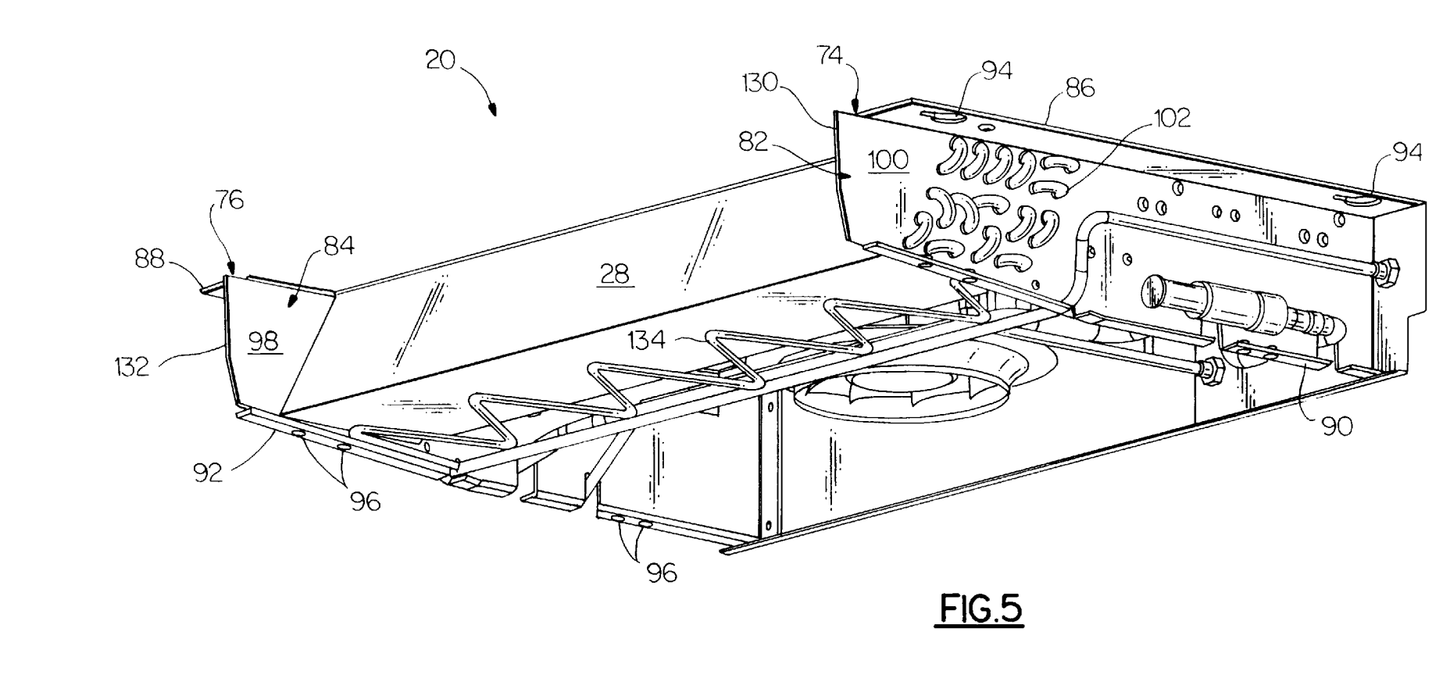
FIG. 5 is a perspective view of the evaporator of FIG. 3 with the entire outer cover removed.
Figure 6:
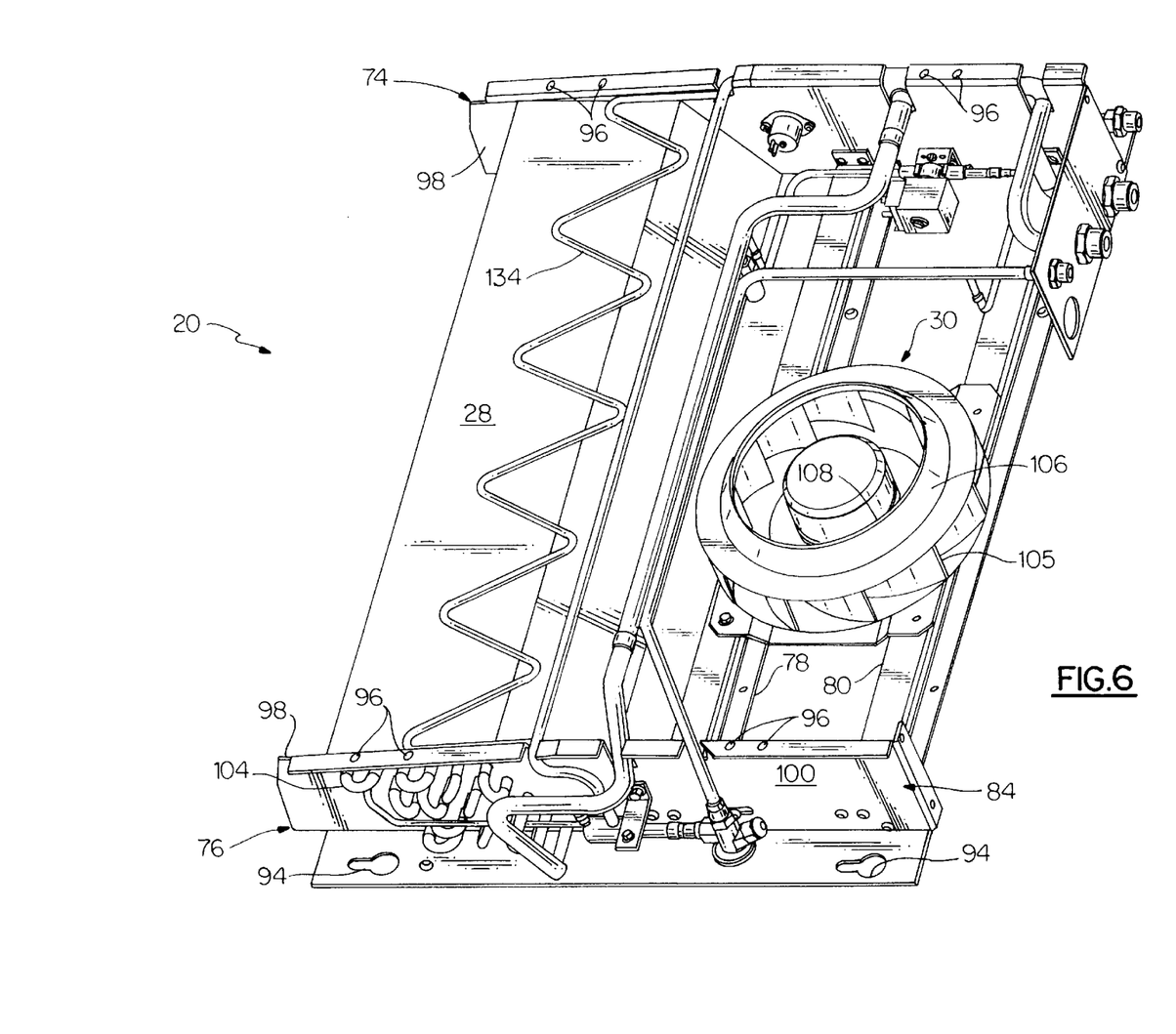
FIG. 6 is a view similar to FIG. 5 from another angle thereof.

FIGS. 5 and 6 illustrate the evaporator unit 20 with the outer cover 25 removed therefrom. The basic components of the evaporator unit include the evaporator coil 28 and the evaporator fan 30. Forming part of the refrigeration circuit is a compressor pressure regulating valve ("CPR") 32 shown in FIG. 5, and a thermostatic expansion valve ("TXV") 34 shown in FIG. 6.

Figure 2:
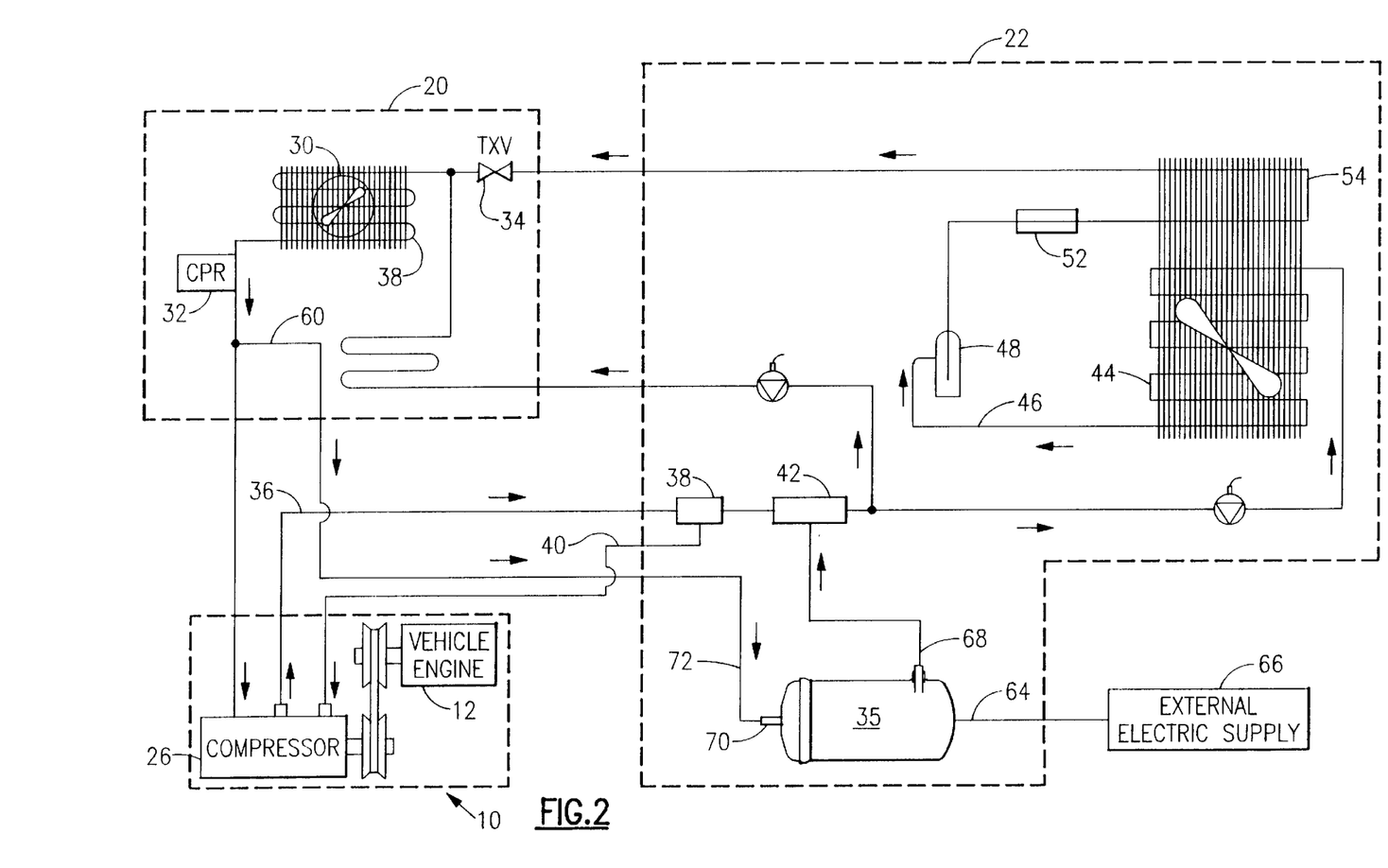
FIG. 2 is a simplified diagrammatic illustration of a transport refrigeration system having an adjustable CPR and TXV.

With reference to FIG. 2, the refrigeration system, which is basically a vapor compression refrigeration system, comprises the previously referred to evaporator unit 20, condenser unit 22, and the road compressor/vehicle engine combination 26 and 12, respectively. As is conventional in such systems, the condenser unit 22 may incorporate an electrically powered stand-by compressor 35. In the illustrated system, as is conventional, during normal road operation when the road compressor 26 is driven by the engine, it compresses the refrigerant in the system, thereby raising its temperature and pressure and forces it, along with a quantity of lubricating oil intermixed therewith, to a discharge line 36. The discharge line 36 conducts the mixture to an oil separator 38 where the hot refrigerant gas and oil are separated from one another and the oil is collected and returned to the compressor via the oil return line 40.

The hot substantially oil-free gaseous refrigerant passes from the separator 38 through a compressor flow control valve 42 to the condenser coil 44 where it condenses and passes via liquid line 46 to the receiver 48. Liquid refrigerant from the receiver passes through refrigerant line 50 through a filter dryer 52 and through an economizer heat exchanger 54 to the thermostatic expansion valve 34. Liquid refrigerant passing through the TXV 34 is partially flashed and dropped in pressure before reaching the evaporator coil 28 where the remaining liquid refrigerant evaporates and the gaseous refrigerant is returned via refrigerant line 60 and the CPR valve 32 to the suction portion 62 of the road compressor 26.

When the truck 10 is stopped and the vehicle engine is not running, the road compressor 26 is not driven and, accordingly, the refrigeration system does not operate. During such conditions when it is desired to run the refrigeration system, the stand-by compressor 35 is coupled through an appropriate electrical connector 64 to an external electric supply 66 to thereby actuate the stand-by compressor 35. During such operation, the compressor control valve 42 and other appropriate valves in the system, as is conventional, result in compressed refrigerant from the stand-by compressor discharge 68 being directed into the refrigeration system and along the path as described hereinabove with gaseous refrigerant returning to the suction port 70 of the stand-by compressor 35 through return line 72.

The previously referred to compressor pressure regulating valve 32 ("CPR") is an adjustable valve installed on the suction line 72 of the compressor to regulate the amount of suction pressure entering the compressor. The CPR valve is adjusted to maintain a maximum suction pressure for CPR settings. The suction pressure is controlled to avoid overloading the compressor's electric motor or engine during high box temperature operation. Most procedures for adjustment of a CPR valve require it to be done while the refrigeration system is operating.

The thermostatic expansion valve 34 ("TXV") is an automatic device which maintains constant superheat of the refrigerant gas leaving the evaporator regardless of suction pressure. The valve functions are:

(a) automatic response of refrigerant flow to match the evaporator load; and
(b) prevention of liquid refrigerant entering the compressor.

Unless such valves are defective, they seldom require any maintenance or adjustment. However, under certain conditions, it is deemed desirable to check the superheat which may require adjustment and access to the TXV while the refrigerant system is operating.

Figure 4:
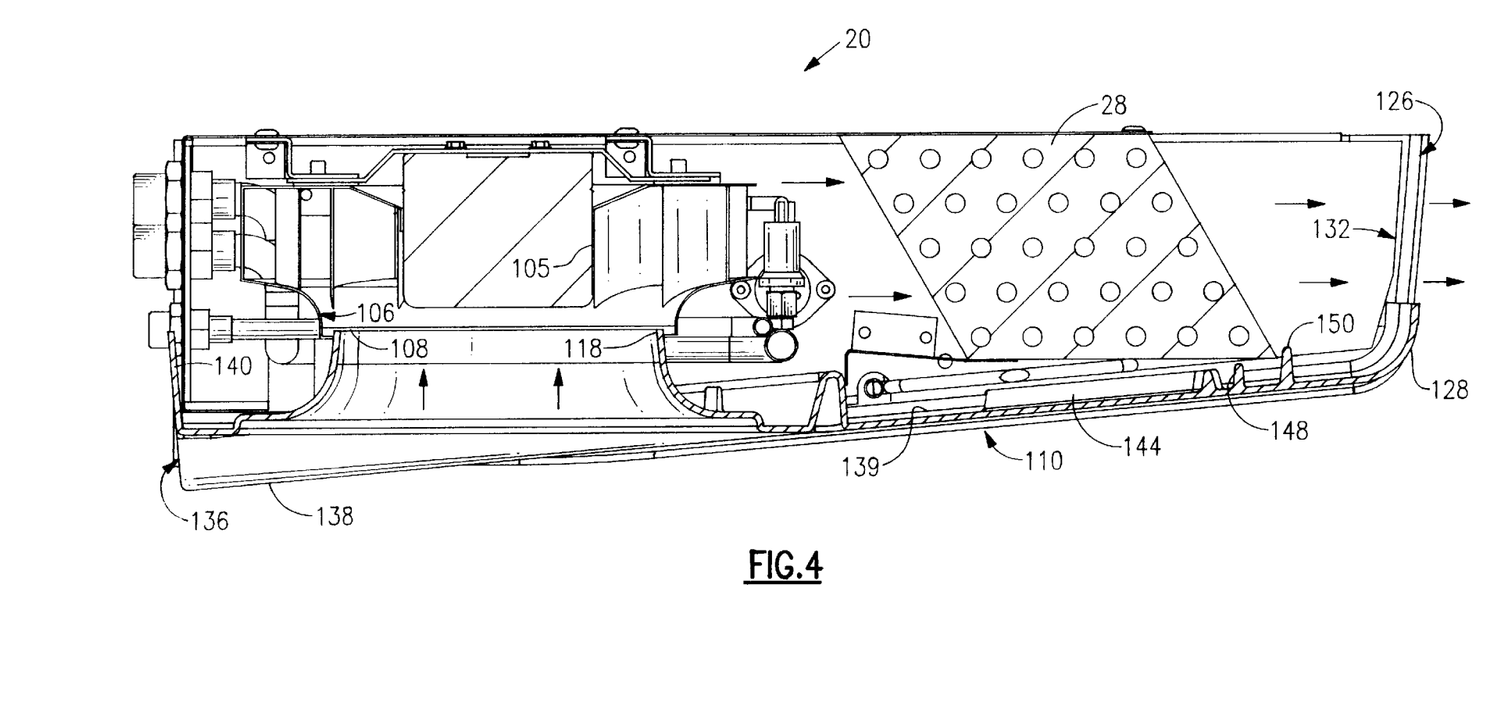
FIG. 4 is a side sectional view of the evaporator of FIG. 3 taken along a line extending through the midpoint of the evaporator fan.

Looking now at FIGS. 5 and 6, the evaporator unit 20 includes a structural framework, which is defined by a pair of lateral structural support channels 74 and 76 positioned on the left and right-hand sides of the evaporator unit 20, as viewed in FIG. 5. Extending between the lateral support channels 74 and 76 are a pair of elongated transverse support channels 78 and 80, which are best seen in FIGS. 4 and 6. Each of the transverse channels 78 and 80 are structurally attached at opposite ends thereof to the left and right-hand support channels 74 and 76. The transverse channels 78 and 80, as best seen in FIGS. 4 and 6, serve as attachment points for the evaporator fan assembly 30.

Each of the lateral support channels 74 and 76 define a U-shaped cross section having a central planar section 82 and 84, respectively, upper flanges 86 and 88, respectively, and lower flanges 90 and 92, respectively. Upper flanges 86 and 88 extend perpendicularly from the center sections 82 and 84 and are provided with suitable openings 94 therein to facilitate attachment of the evaporator unit to the upper wall 15 of the conditioned cargo space 14. The lower flanges 90 and 92 also extend perpendicularly outwardly from their respective center flanges and are provided with two sets of threaded attachment means 96 to facilitate attachment of the outer cover 25 to the evaporator cover, as will be described in detail in connection with the description of the outer cover.

The center sections 82 and 84 of the lateral channels 78 and 80 each have inwardly facing sides 98 to which the above-mentioned transverse channels 78 and 80 are structurally attached and outwardly facing sides 100. The outwardly facing sides 100 and the respective upper and lower flanges cooperate to define outwardly facing U-shaped spaces on opposite sides of each of the support channels 74 and 76.

As seen in FIGS. 5 and 6, the evaporator heat exchanger 28 extends between the lateral support channels 74 and 76, with the center portions 82 and 84, respectively, serving as the tube sheets of the heat exchanger. As best seen in FIG. 5, the hairpin turns 102 on the right-hand side of the evaporator coil are located in the U-shaped space adjacent the outer surface 100 of the right hand support channel 74. Also located in the U-shaped space adjacent the right-hand support channel is the previously described CPR valve 32. Similarly, as best shown in FIG. 6, the hairpin turns 104 associated with the left-hand side of the evaporator heat exchanger 28 are located in the U-shaped space adjacent the outside surface 100 of the left-hand support channel 74. Also located in the U-shaped space adjacent the left-hand support channel 74 is the previously described TXV 34.

As previously mentioned, the entire fan assembly 30 is attached to the transverse channels 78 and 80. As best seen in FIGS. 4 and 6, the fan comprises a centrifugal fan 105 having a shroud 106 defining an intake opening 108 which, as will be seen, is adapted to cooperate with the outer cover 25 to define the flow path through the evaporator from the intake opening into the interior of the evaporator and forwardly through the evaporator heat exchange coil 28.

Figure 3:
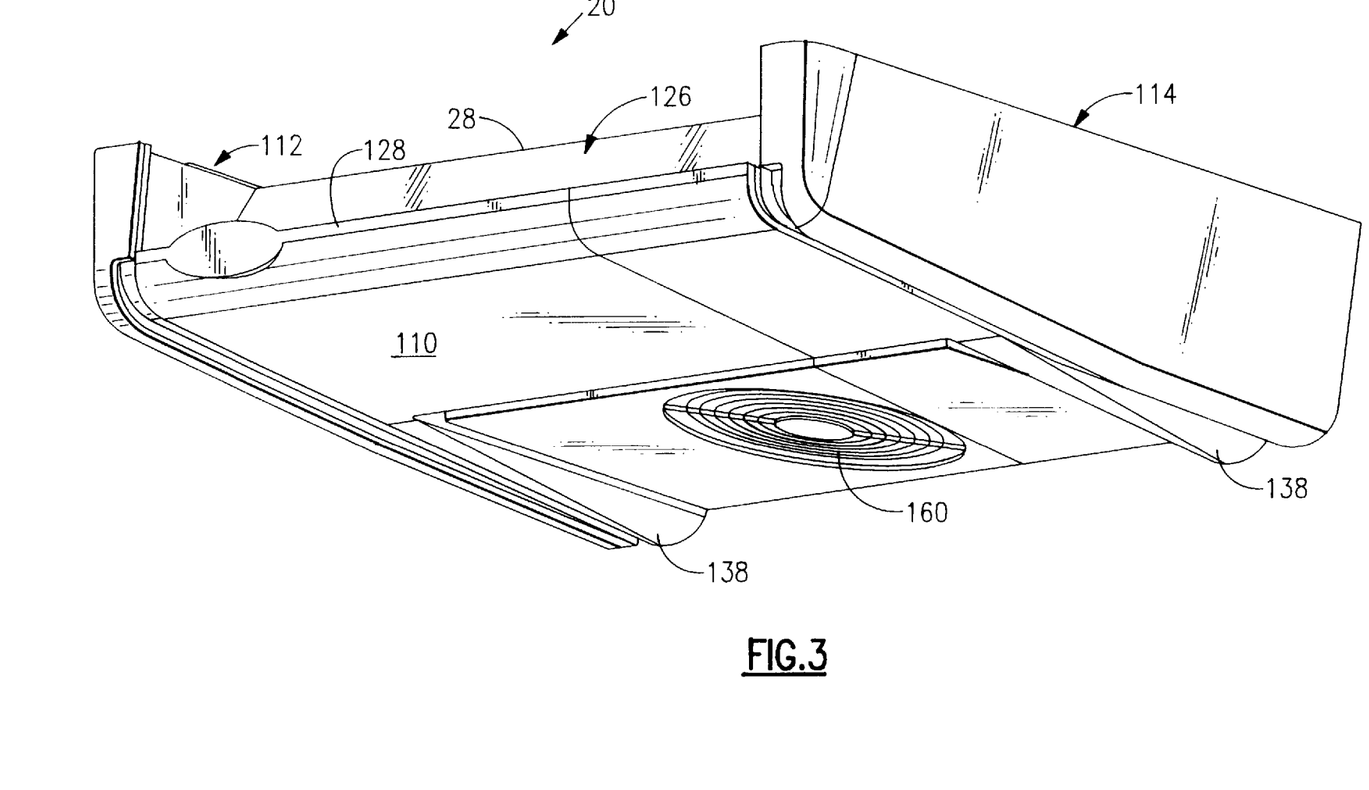
FIG. 3 is a perspective view of an evaporator unit according to the present invention.

With reference to each of FIGS. 3 through 10, it will be seen that the outer cover 25 of the evaporator unit 20 is made up of three molded plastic components—a bottom cover 110, a left-hand cover 112, and a right-hand cover 114 (again, the convention is with left and right with reference to the orientation as viewed in FIGS. 3 and 5).

Figure 10:
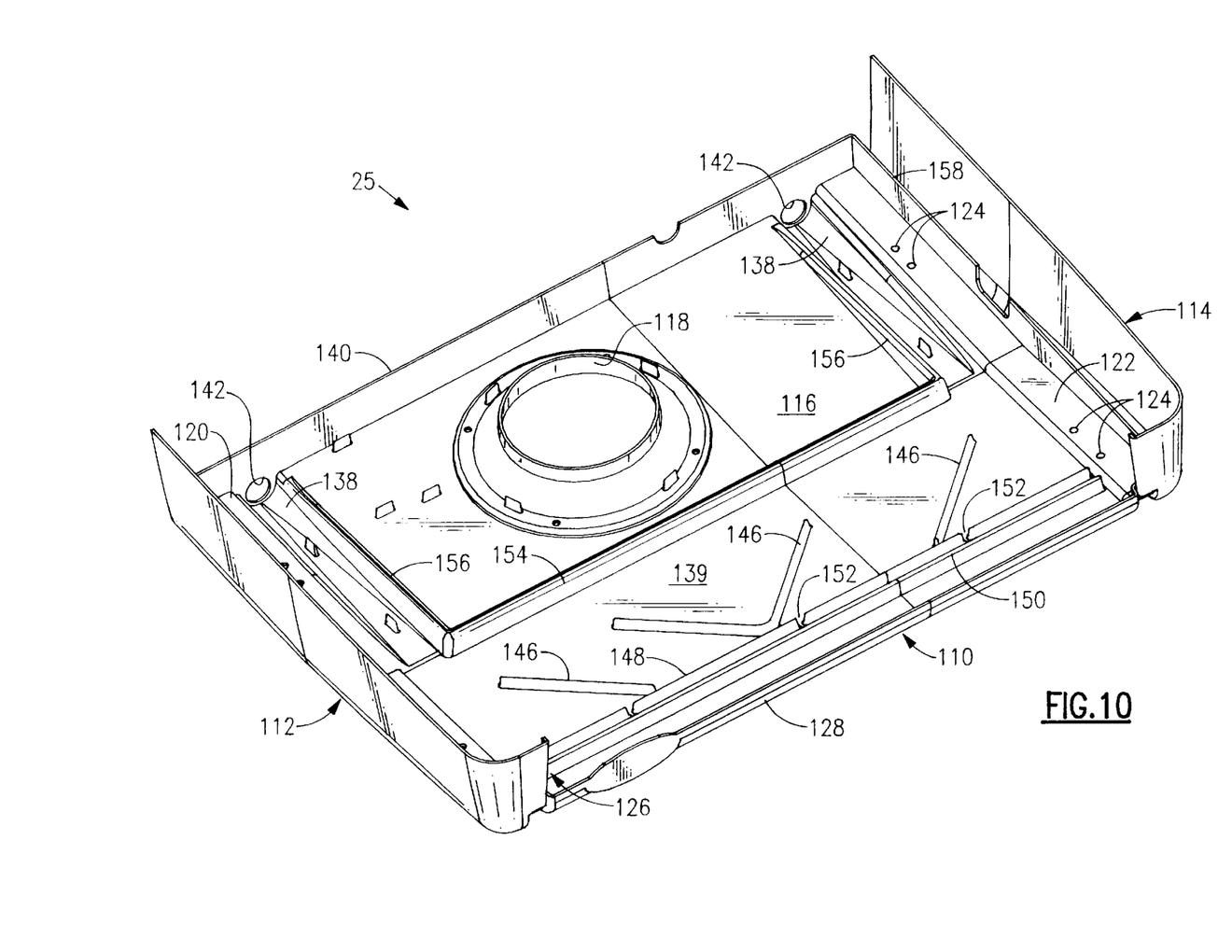
FIG. 10 is a perspective view illustrating the features of the interior of the three-piece cover of the evaporator unit illustrated in FIG. 3.

With particular reference now to FIGS. 4 and 10, the bottom cover 110 comprises a central substantially planar wall section 116 having a through opening 118 molded integrally therewith, which is adapted to be received in the evaporator fan shroud opening 106. The bottom cover 110 includes left and right attachment flanges 120 and 122, each of which is provided with a series of openings 124 therein, which are adapted to axially align with the attachment means 96 provided in the lower flanges 90 and 92, respectively, of the left and right-hand support channels. With the appropriate openings 124 aligned with the appropriate attachment means 96, threaded fasteners inserted pass through the appropriate attachment holes will readily assemble bottom cover 110 to the evaporator unit 120.

As assembled, the bottom cover 110, and the left and right support channels 74 and 76 cooperate with the forward wall 16 and the upper wall 15 of the conditioned cargo space to define the air flow path through the evaporator unit 20. The air discharge opening 126 of the air flow path is defined by the horizontal front edge 128 of the bottom cover 110 and the front edges 130 and 132 of the left and right support channels 74 and 76, respectively.

With reference to FIG. 4, the air flow path through the evaporator unit 20 is represented in a simplified fashion by directional arrows 134. It will be appreciated that during operation of the evaporator unit as warm humid air is passed over the evaporator coil 28, the air is not only cooled but condenses moisture from the cooled air. Further, as best seen in FIGS. 4, 5 and 6, the evaporator unit is provided with a hot gas defrost system comprising a zig-zag copper tubing arrangement 134 underlying the evaporator coil 28. Such a defrost arrangement is well known in the art for removing ice build up from the evaporator coil under certain operating conditions. When in operation, hot gas from the compressor is directed to the defrost coil 134 and serves to melt accumulated ice, which has formed on the fins of the evaporator coil 28.

Accordingly, during removal of humidity from the air passing through the evaporator and during defrost operation, an accumulation of water can be expected to build up on the evaporator coil. The bottom cover 110 serves to accumulate and dispose of such water without having water drip on items stored in the conditioned space or without having water blown into the conditioned space by way of the refrigerated air flow being directed into the conditioned space.

Looking now at FIGS. 4 and 10, it will be noted that the planar bottom 116 of the bottom cover 110 extends generally from a higher elevation at the front end 128 thereof to a lower elevation at the rear 136 thereof. Further, located on each side of the bottom cover 110 inboard from the left and right attachment flanges 120 and 122 are a pair of water disposal channels 138. Each of these channels extends from an inclined region 139 generally underlying evaporator coil 28 and extends rearwardly and downwardly to a substantially lower elevation at a rear wall 140 of the bottom cover 110. The rear wall 140 is provided with water discharge openings 142 adjacent the lower end of each of the channels 138. Each of the openings 142 is adapted to be fluidly connected with an appropriate water disposal arrangement provided in the truck installation.

The region 139 of the bottom cover underlying the evaporator coil 28 is provided with several upstanding water discharge guide ridges extending upwardly from the bottom cover. A first ridge 144 is substantially V-shaped with its apex facing the discharge opening and the legs extending rearwardly and laterally towards the water disposal channels 138. Another pair of ridges 146 are on opposite sides of the V-shaped ridge 144 and are disposed at approximately the same angle as the legs of the V-shaped ridge. Forwardly of the ridges 144 and 146 are a pair of transversely extending walls 148 and 150. As best seen in FIG. 4, the wall 148 is adapted to underlie the front edge of the evaporator coil 28 and is provided with a number of spaced openings 152 therealong. The other transverse wall 150 is higher than the first wall 148 and is adapted to extend above the lower most portion of the evaporator coil 28. The wall 152 extends continuously across the front of the bottom cover 110. Each of the ridges 144, 146 and the walls 148 and 150 are designed to manage water in the system. Specifically, they serve to encourage water dropping from the evaporator coil under the influence of gravity to flow in the direction of the water collection channels 138. Further, they serve to slow down any water which may be entrained in the discharge air flowing through or attempting to flow under the evaporator coil to cause it to fall out of the air flow and to thereby be directed to the water discharge channels 138.

With the continued reference to FIGS. 4 and 10, it will be noted that the bottom cover 110 further includes an upstanding three segment wall surrounding the air intake opening 118. The wall comprises an elongated section 154 extending between the entrances to the water collection channels 138 and a pair of integrally formed rearwardly extending extensions 156, which extend parallel to and inwardly from the water collection channels 138. The walls 154 and 156 further serve to isolate the air flow from the water collection and management features, as described hereinabove.

Figure 7:
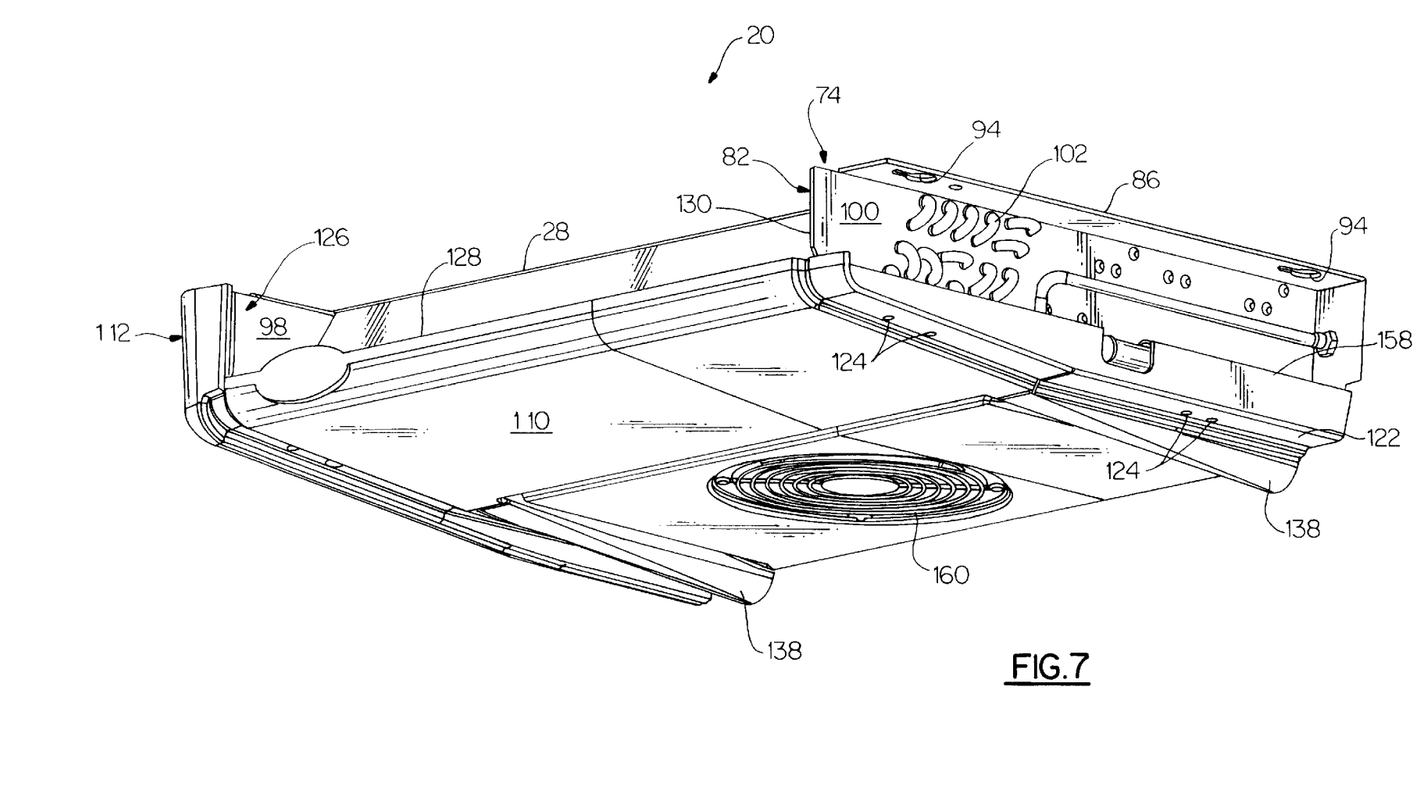
FIG. 7 is a view similar to FIG. 3 with the right side cover removed therefrom.
Figure 8:
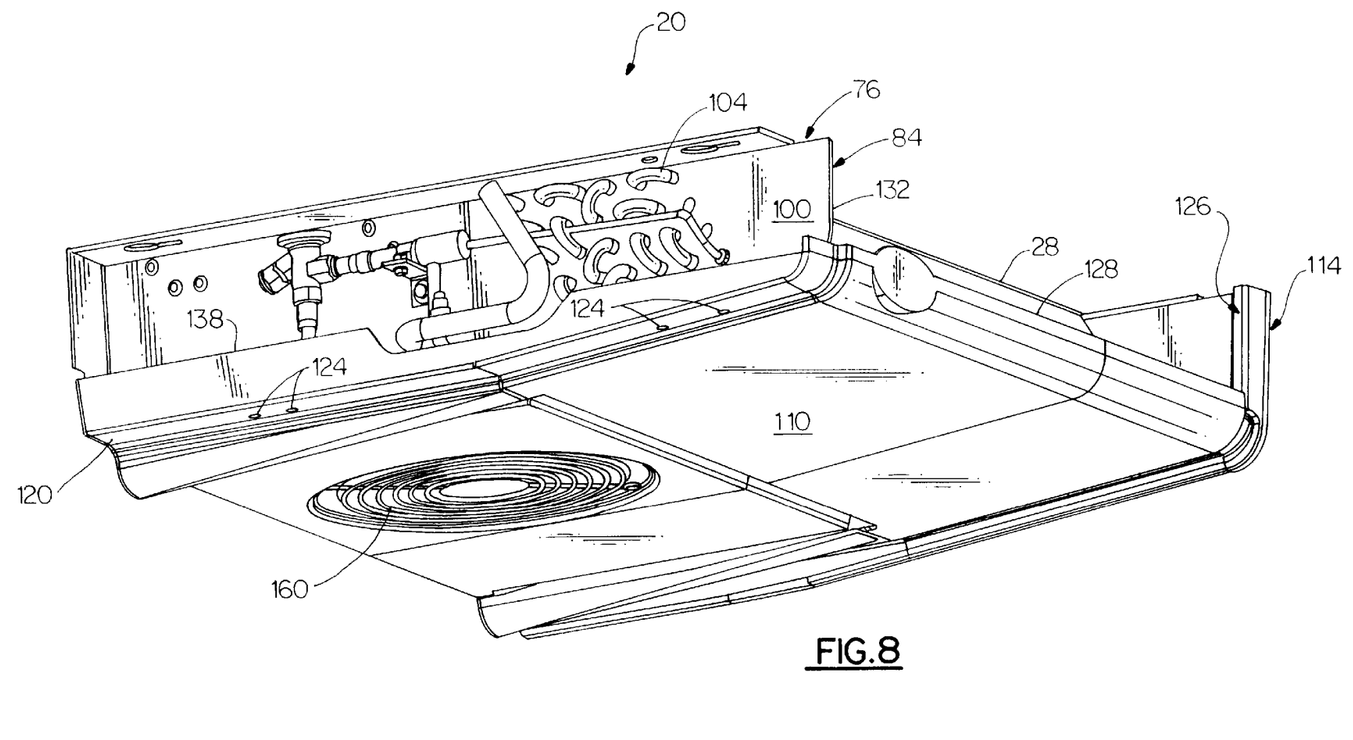
FIG. 8 is a perspective view of the left side of the evaporator unit of FIG. 3, with the left side cover removed therefrom.

With reference to FIGS. 7 and 8, it will be noted that the left and right attachment flanges 120 and 122 of the bottom cover 110 extend laterally outwardly beyond the lateral extension of all of the components of the refrigeration circuit, which are contained in the U-shaped regions adjacent the support channels 74 and 76. Further, each of the flanges 120 and 122 includes an upwardly extending extension 158 which serves to further define the water collection and management system described above. As a result, any condensation dripping from the hairpin turns on the sides of the unit, or from the TXV or the CPR, or any of the other associated piping will be collected by these extensions of the bottom cover 110.

Further, it will be noted with reference to FIGS. 7 and 8, where the entire unit is shown with the left and right-hand end covers removed, the CPR valve and the TXV valve 32 and 34, respectively, may be readily accessed with the bottom cover installed and the appropriate end cover removed. As a result, the system may be operated in a normal operating mode providing access to the CPR and the TXV while fully protecting the operator from the evaporator fan 30. It should be noted that for further safety an evaporator intake grill 160 is installed in the opening in the bottom cover 110.

Figure 9:
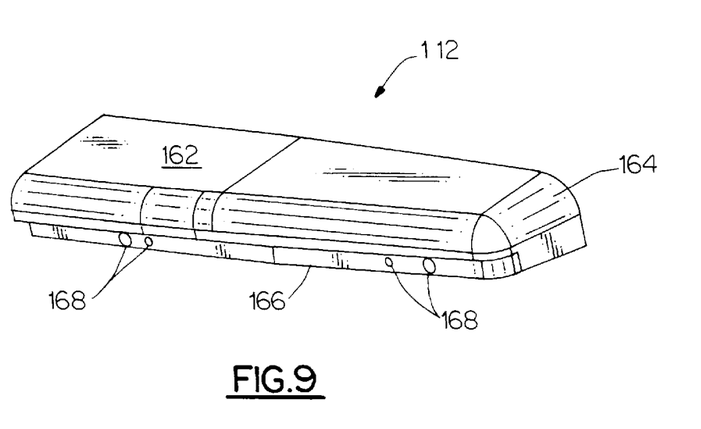
FIG. 9 is a perspective view of the left side cover.

FIG. 9 illustrates the left-hand end cover 112. The cover comprises a substantially planar side section 162, an integrally formed curved front section 164, and an attachment flange 166. The attachment flange 166 is provided with a pair of through openings 168 therein, which are adapted to align with the mating openings in the left attachment flange 120 of the bottom cover 110 and the appropriate attachment means 96 in the left-hand support channel. The right-hand end cover 114 is a mirror image of the left-hand end cover and each are adapted to be readily attached or removed from the evaporator unit 20 with the bottom cover 110 installed by use of suitable threaded fastening means. Accordingly, the left and right-hand end covers may be readily removed with the unit in operation without affecting the operation of the unit thereby facilitating adjustment of the CPR and TXV as necessary.

What is claimed is:

1. An evaporator for a transport refrigeration system, the evaporator being of the type configured to be mounted in a conditioned space having insulated walls, said evaporator having a downwardly facing air intake and an air discharge end extending substantially horizontally within the conditioned space, said evaporator comprising:

a structural frame configured to facilitate attachment of said evaporator to at least one of said walls, said structural frame comprising first and second lateral supports, said lateral supports extending substantially horizontally and in spaced parallel relationship to one another on opposite sides of said evaporator, said lateral supports having an inwardly facing side and an outwardly facing side, a front end of each of said lateral supports defining in part an air discharge opening in said air discharge end, and at least one horizontal structural member interconnecting said first and second lateral supports;

a fan, structurally supported by said at least one structural member at a location in fluid flow communication with said air intake;

a heat exchange coil extending between said first and second structural members at a location intermediate the location of said front ends and the location of said fan, said first and second structural members serving as tube sheets of said heat exchange coil and having at least a portion of said coil located adjacent said outwardly facing sides of said lateral supports;

an outer cover comprising:

a bottom portion configured to underlie said evaporator, said bottom extending, laterally, beyond said portions of said heat exchange coil which are located adjacent said outwardly facing sides of said lateral supports, said bottom having an air intake opening therein in fluid flow communication with said fan, said bottom portion further including a front edge which defines the lower portion of said air discharge opening, and a rear edge which cooperates with a wall of conditioned space to partially define the back of said evaporator;

means for attaching said bottom portion to said structural frame;

a pair of side covers configured to be installed on right and left sides of said evaporator to enclose said portion of said coil that is adjacent said outwardly facing sections of said lateral supports.

2. The apparatus of claim 1 wherein said bottom portion is configured such that when installed on said evaporator, it defines an inclined inwardly facing interior surface extending from said front edge rearwardly downwardly to said rear edge.

3. The apparatus of claim 2 wherein said inwardly facing surface comprises condensate diversion structure formed thereon to encourage flow of condensate water from said heat exchange coil to the rear of said evaporator unit.

4. The apparatus of claim 3 wherein said bottom portion comprises at least one condensate discharge channel adjacent a lateral edge thereof configured to collect water from said heat exchange coil and direct such water downwardly and rearwardly to an opening formed in the rear edge of said bottom portion.

5. The apparatus of claim 4 further including at least one horizontally extending rib formed in said inwardly facing surface of said bottom portion adjacent a front edge of said heat exchange coil.

6. The apparatus of claim 1 further including an adjustable element of a refrigeration circuit in fluid flow communication with said heat exchange coil and located in the region adjacent said outwardly facing sides of at least of said lateral supports; and     wherein said side cover configured to enclose said lateral support including said adjustable component of said refrigeration circuit is readily removable from said evaporator unit while said evaporator is operating to facilitate adjustment of said component.

7. The apparatus of claim 5 wherein the other of said lateral supports further includes an adjustable refrigeration circuit component and the other of said side covers is also readily removable to facilitate adjustment of both of said adjustable refrigeration components when said evaporator unit is in operation.

\* \* \* \* \*